United States Patent
Tong et al.

(10) Patent No.: US 10,706,505 B2
(45) Date of Patent: Jul. 7, 2020

(54) METHOD AND SYSTEM FOR GENERATING A RANGE IMAGE USING SPARSE DEPTH DATA

(71) Applicant: GM GLOBAL TECHNOLOGY OPERATIONS LLC, Detroit, MI (US)

(72) Inventors: Wei Tong, Troy, MI (US); Shuqing Zeng, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 15/878,937

(22) Filed: Jan. 24, 2018

(65) Prior Publication Data
US 2019/0228504 A1 Jul. 25, 2019

(51) Int. Cl.
G06K 9/00 (2006.01)
G06K 9/62 (2006.01)
G06T 15/00 (2011.01)
G06T 3/40 (2006.01)
G01S 17/89 (2020.01)
G06K 9/42 (2006.01)
G06K 9/46 (2006.01)
G06T 7/50 (2017.01)

(52) U.S. Cl.
CPC ............ G06T 3/4053 (2013.01); G01S 17/89 (2013.01); G06K 9/42 (2013.01); G06K 9/4604 (2013.01); G06T 7/50 (2017.01)

(58) Field of Classification Search
USPC ...................... 382/154, 156; 348/48; 345/419
See application file for complete search history.

(56) References Cited

U.S. PATENT DOCUMENTS

| | | | | |
|---|---|---|---|---|
| 6,269,153 B1* | 7/2001 | Carpenter | ............ | H04M 1/645 379/88.02 |
| 7,672,504 B2* | 3/2010 | Childers | ................. | G06T 7/521 382/154 |
| 8,340,402 B2* | 12/2012 | Schmitt | ............... | H04N 13/271 382/154 |
| 8,643,701 B2* | 2/2014 | Nguyen | ................. | G06T 5/003 348/47 |
| 9,030,470 B2* | 5/2015 | Wang | ................. | G01B 11/2509 345/419 |

(Continued)

OTHER PUBLICATIONS

Fan et al, "RGB-D scene labeling with multimodal recurrent neural networks" 2017 IEEE conference on computer vision and pattern recognition workshops, pp. 203-211. (Year: 2017).*

(Continued)

Primary Examiner — Kathleen Y Dulaney
(74) Attorney, Agent, or Firm — Cantor Colburn LLP

(57) ABSTRACT

A system and method for generating a range image using sparse depth data is disclosed. The method includes receiving, by a controller, image data of a scene. The image data includes a first set of pixels. The method also includes receiving, by the controller, a sparse depth data of the scene. The sparse depth data includes a second set of pixels, and the number of the second set of pixels is less than the number of first set of pixels. The method also includes combining the image data and the sparse depth data into a combined data. The method also includes generating a range image using the combined data.

16 Claims, 4 Drawing Sheets

(56) References Cited

U.S. PATENT DOCUMENTS

| | | | | |
|---|---|---|---|---|
| 2005/0105827 A1* | 5/2005 | Yonaha | G06K 9/4633 | 382/291 |
| 2005/0196035 A1* | 9/2005 | Luo | G06K 9/6255 | 382/159 |
| 2005/0286767 A1* | 12/2005 | Hager | G06K 9/00208 | 382/190 |
| 2009/0123070 A1* | 5/2009 | Xiaoying | G06T 7/11 | 382/176 |
| 2009/0196491 A1* | 8/2009 | Stainlay | G06T 7/55 | 382/154 |
| 2010/0172567 A1* | 7/2010 | Prokoski | A61B 5/0064 | 382/132 |
| 2010/0309292 A1* | 12/2010 | Ho | H04N 13/261 | 348/47 |
| 2011/0211749 A1* | 9/2011 | Tan | G06T 7/11 | 382/154 |
| 2011/0299736 A1* | 12/2011 | Choi | G06K 9/00664 | 382/106 |
| 2012/0039525 A1* | 2/2012 | Tian | G06T 5/005 | 382/154 |
| 2012/0163701 A1* | 6/2012 | Gomi | H04N 13/261 | 382/154 |
| 2012/0182392 A1* | 7/2012 | Kearns | B25J 5/007 | 348/46 |
| 2012/0250978 A1* | 10/2012 | Taylor | G06K 9/00771 | 382/154 |
| 2012/0294527 A1* | 11/2012 | Lukac | G06K 9/40 | 382/167 |
| 2013/0010070 A1* | 1/2013 | Tateno | B25J 9/1697 | 348/46 |
| 2013/0129192 A1* | 5/2013 | Wang | H04N 13/246 | 13/246 |
| 2013/0129193 A1* | 5/2013 | Wang | G06K 9/00208 | 382/154 |
| 2013/0230235 A1* | 9/2013 | Tateno | G06T 19/003 | 382/154 |
| 2013/0236089 A1* | 9/2013 | Litvak | G06K 9/00382 | 382/154 |
| 2013/0301906 A1* | 11/2013 | Yoon | G06T 17/00 | 382/154 |
| 2014/0002611 A1* | 1/2014 | Katz | G01S 17/89 | 348/46 |
| 2014/0153816 A1* | 6/2014 | Cohen | G01S 17/894 | 382/154 |
| 2014/0169701 A1* | 6/2014 | Cui | G06T 3/4053 | 382/299 |
| 2014/0254874 A1* | 9/2014 | Kurz | G06K 9/42 | 382/103 |
| 2014/0368615 A1* | 12/2014 | van Baar | G01S 17/89 | 348/48 |
| 2015/0015569 A1* | 1/2015 | Jung | G06T 3/4053 | 345/419 |
| 2015/0206318 A1* | 7/2015 | Parfenov | G06T 5/003 | 382/154 |
| 2015/0235351 A1* | 8/2015 | Mirbach | G06T 5/002 | 382/154 |
| 2015/0248764 A1* | 9/2015 | Keskin | H04N 5/33 | 382/106 |
| 2015/0279016 A1* | 10/2015 | Kim | G06T 7/80 | 382/154 |
| 2016/0134858 A1* | 5/2016 | Xie | G01S 15/87 | 348/46 |
| 2016/0198147 A1* | 7/2016 | Waligorski | G01S 17/36 | 348/49 |
| 2016/0231866 A1* | 8/2016 | Tretter | G06F 3/14 | |
| 2017/0180639 A1* | 6/2017 | Kamilov | G06T 7/50 | |
| 2017/0200273 A1* | 7/2017 | Kamilov | G06T 5/50 | |
| 2018/0059225 A1* | 3/2018 | Zhu | G06T 5/50 | |
| 2018/0211128 A1* | 7/2018 | Hotson | G06K 9/4604 | |
| 2018/0211403 A1* | 7/2018 | Hotson | G06K 9/4604 | |

OTHER PUBLICATIONS

Gao et al, "Object Classification Using CNN-Based Fusion of Vision and LIDAR in Autonomous Vehicle Environment", IEEE transactions on industrial informatics, vol. 14, No. 9, Sep. 2018, pp. 4224-4231. (Year: 2018).*

Song et al, "learning effective RGB-D Representations for Scene recognition", IEEE transactions on image processing, vol. 28, No. 2, Feb. 2019, pp. 980-993. (Year: 2019).*

* cited by examiner

METHOD AND SYSTEM FOR GENERATING A RANGE IMAGE USING SPARSE DEPTH DATA

INTRODUCTION

The subject embodiments relate to generating a range image using sparse depth data. Specifically, one or more embodiments can be directed to generating a high-resolution range image by using at least one camera and at least one range sensor. One or more embodiments can generate the high-resolution range image by combining image data (that is captured by the at least one camera) with sparse depth data (that is captured by the at least one range sensor), for example.

A range image is a two-dimensional image where distances between a specific point (i.e., a location where a range sensor is positioned) and points within a scene of the two-dimensional image are reflected by the two-dimensional image. With certain range images, the pixels that make up the range images can include values that correspond to the distances between the specific point and the points within the captured scene.

SUMMARY

In one exemplary embodiment, a method includes receiving, by a controller, image data of a scene. The image data includes a first set of pixels. The method also includes receiving, by the controller, a sparse depth data of the scene. The sparse depth data includes a second set of pixels, and the number of the second set of pixels is less than the number of first set of pixels. The method also includes combining the image data and the sparse depth data into a combined data. The method also includes generating a range image using the combined data.

In another exemplary embodiment, the method also includes performing a feature extraction process on the image data to generate a features vector.

In another exemplary embodiment, the second set of pixels corresponds to a fixed number of pixels arranged at fixed pixel locations.

In another exemplary embodiment, the receiving the image data includes receiving the image data from a monocular camera.

In another exemplary embodiment, the method also includes training the controller to perform feature extraction and regression.

In another exemplary embodiment, the training the controller includes training to reduce a depth error between a generated depth data and an actual depth data.

In another exemplary embodiment, the training the controller includes training to preserve a consistent ordering of depth of pixels.

In another exemplary embodiment, the features vector reflects identified spatial relationships between different identifiable features.

In another exemplary embodiment, a system within a vehicle includes an electronic controller that is configured to receive image data of a scene. The image data includes a first set of pixels. The electronic controller is also configured to receive a sparse depth data of the scene. The sparse depth data includes a second set of pixels, and the number of the second set of pixels is less than the number of first set of pixels. The electronic controller is also configured to combine the image data and the sparse depth data into a combined data. The electronic controller is also configured to generate a range image using the combined data.

In another exemplary embodiment, the electronic controller is further configured to perform a feature extraction process on the image data to generate a features vector.

In another exemplary embodiment, the second set of pixels corresponds to a fixed number of pixels arranged at fixed pixel locations.

In another exemplary embodiment, the receiving the image data includes receiving the image data from a monocular camera.

In another exemplary embodiment, the controller is further configured to perform a first normalization on the sparse depth data. The first normalization includes modifying values of the sparse depth data in accordance with a range of values of the features vector.

In another exemplary embodiment, the controller is further configured to perform a second normalization on the combined data. The second normalization includes modifying the combined data into a specific vector length.

In another exemplary embodiment, the controller is trained to perform feature extraction and regression.

In another exemplary embodiment, the training the controller includes training to reduce a depth error between a generated depth data and an actual depth data.

In another exemplary embodiment, the training the controller includes training to preserve a consistent ordering of depth of pixels.

In another exemplary embodiment, the features vector that reflects identified spatial relationships between different identifiable features.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
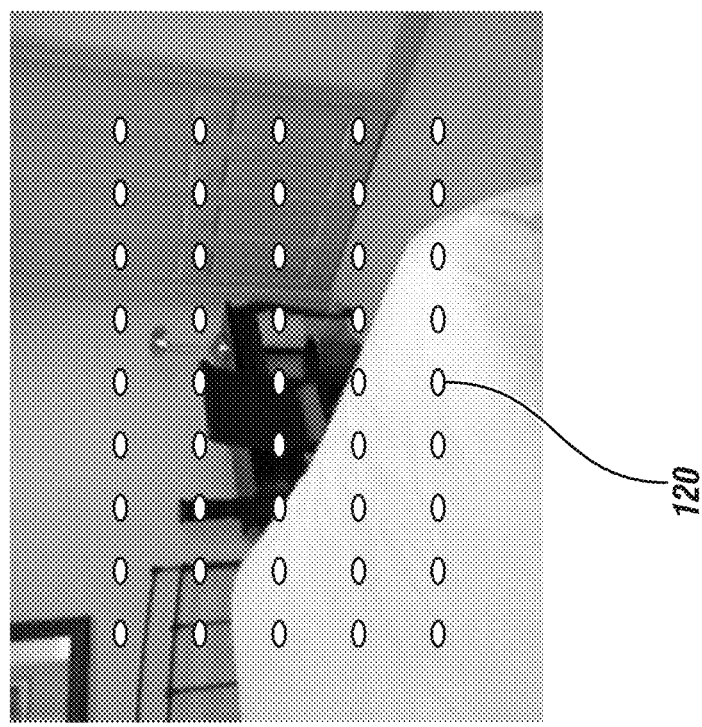
FIG. 1 illustrates example image data and example depth data in accordance with one or more embodiments.
Figure 1:
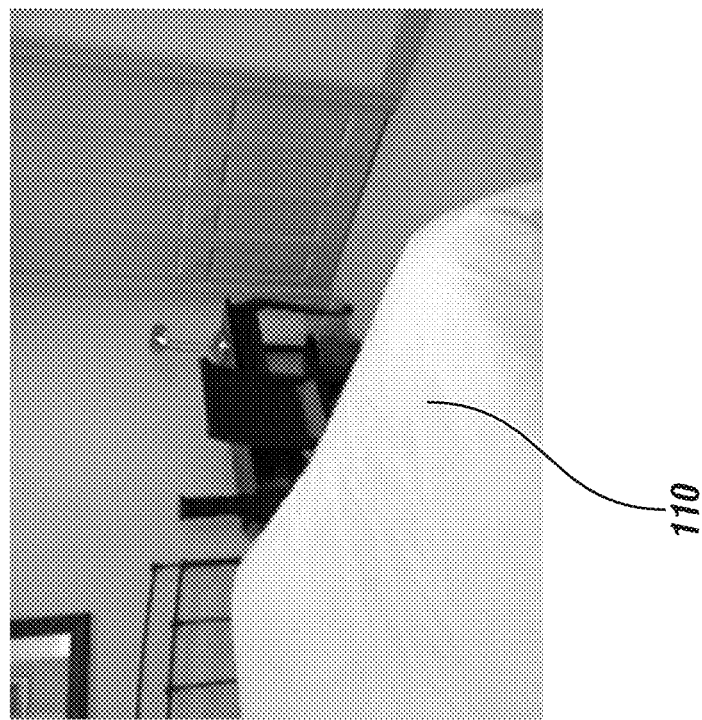

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As described above, a range image is a two-dimensional image where distances between a specific point (i.e., a location where a sensor is positioned) and points within a scene of the two-dimensional image are reflected by the two-dimensional image. The ability to generate high-quality range images is becoming increasingly important as new technologies emerge. For example, the ability to generate high-quality range images is necessary in order to enable assisted-driving and automated-driving technologies. Specifically, a vehicle that is capable of automated driving will generally need to reference captured high-quality range images in order to perform detection of objects in an environment and to perform recognition of objects in the environment. Additionally, the vehicle may need to refer to captured high-quality range images in order to determine a current location of the vehicle and in order perform mapping and planning functions, for example.

Conventional approaches for obtaining distance/depth data of objects in an environment can use light-detection-and-ranging (LIDAR) technologies, can use stereo-vision technologies, and/or can use depth-prediction techniques on monocular images. However, each of these approaches generally exhibit significant technical limitations. Approaches which use LIDAR technology to determine distance/depth data of an environment generally cannot provide high-resolution distance/depth data for objects that are located at farther distances away from the LIDAR device. Approaches which use stereo-vision technology are also unable to provide high-resolution distance/depth data for objects that are located further away. Finally, approaches which perform depth-prediction using monocular images generally require objects of the environment (that are captured within monocular images) to exhibit relative movement between images. However, in the absence of relative movement of objects within the environment, such approaches are generally ineffective in determining distance/depth data of the objects, and such approaches generally exhibit low performance in determining the requisite distance/depth data.

In view of the above-described shortcomings of the conventional approaches and the need for generating high-quality range images, one or more embodiments are directed to a low-cost method that generates range images which have higher resolution as compared to the range images that are generated by the current approaches.

The method of one or more embodiments can be implemented using current cameras and range measurement devices. Further, because one or more embodiments can generate the high-quality range images using a computer-implemented method, these embodiments can generate the high-quality range images at a lower cost compared to the conventional approaches.

One or more embodiments are directed to a system and method that generates a high-resolution range image by combining image data of a scene with a sparse depth data of the scene. The image data of the scene can be captured using a monocular camera, for example. The sparse depth data of the scene can be captured by using one or more range sensors, for example.

The image data of a scene can be a set of elements/pixels that collectively form a visual representation of the scene, where each pixel can store a digital value that reflects a portion of the visual representation of the scene. The image data can be a number of pixels that are arranged in rows and columns.

The sparse depth data can be a set of elements/pixels that show the distance from points in a scene (that are associated with the elements/pixels of the sparse depth data) to a specific point related to the one or more range sensors that capture the sparse depth data. As such, each pixel of the depth data can store data regarding the distance between a point in the scene (that is associated with pixel) and the one or more range sensors. The pixels of the depth data can be considered to be sparse because the number of pixels of depth data is less than the number of pixels of image data. The pixels of the depth data can be a fixed number of pixels at fixed locations.

FIG. 1 illustrates example image data 110 and example depth data 120 in accordance with one or more embodiments. In FIG. 1, example image data 110 represents a scene with different features (i.e., a bed, a nightstand, a door, etc.). Example depth data 120 includes a plurality of elements/pixels 120, where each pixel corresponds to a specific point in the scene. Each pixel stores data regarding the distance between the point in the scene (that is associated with the pixel) and the sensor that captured the depth data. In the example of FIG. 1, depth data 120 includes 45 pixels, arranged in 9 columns and 5 rows. As described, the depth data of 45 pixels can be sparse because the number of depth pixels (45 pixels) is less than the number of pixels that make up image data 110. Once captured, the image data 110 can be combined with depth data 120. The sparse depth data 120 can be obtained by using means such as, for example, light detection and ranging (LIDAR), radar, etc.

Figure 2:
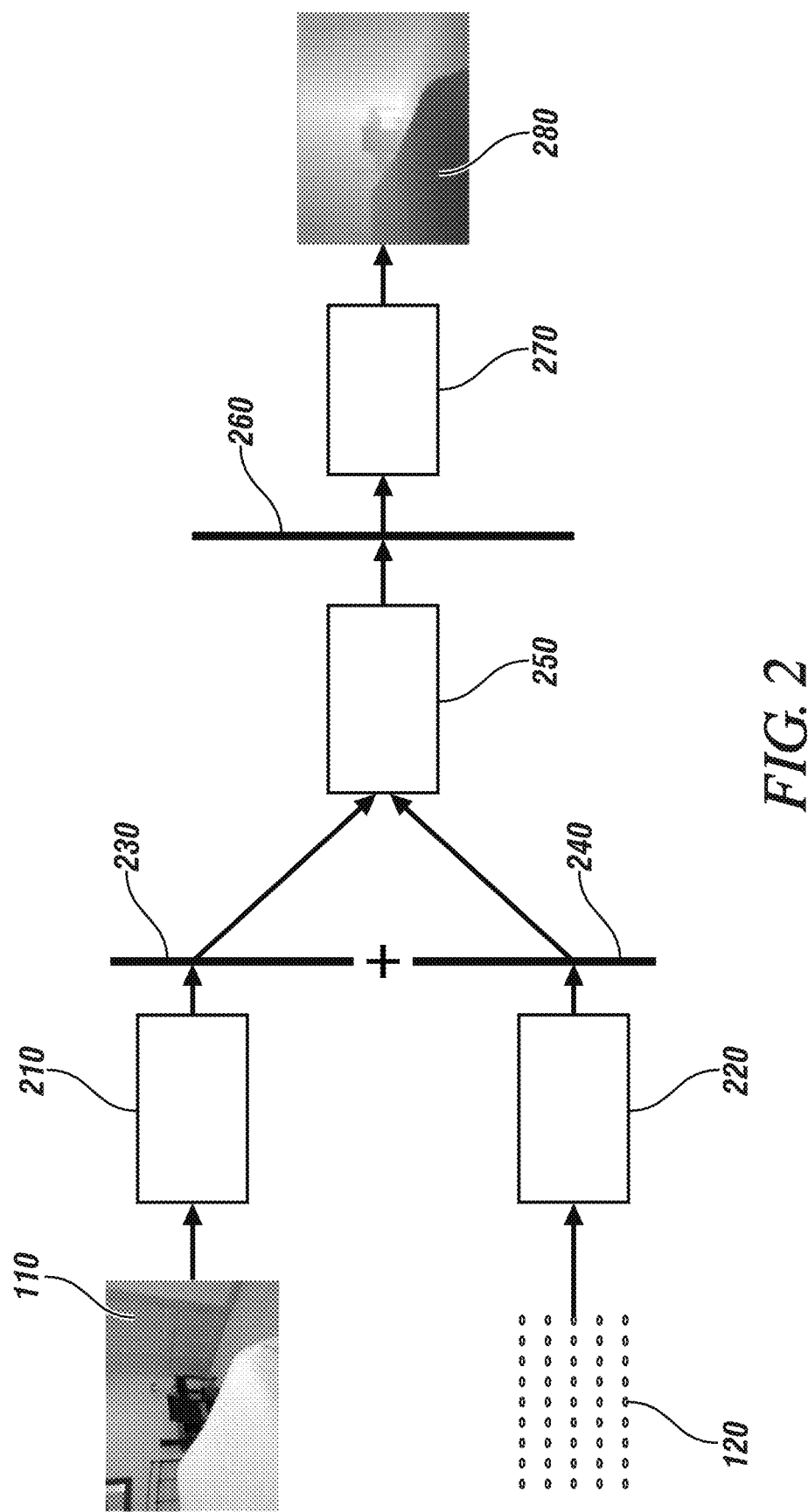
FIG. 2 illustrates combining example image data and example depth data in accordance with one or more embodiments.

FIG. 2 illustrates combining example image data 110 and example depth data 120 in accordance with one or more embodiments. Image data 110 can be captured using a monocular camera, for example. A process of feature extraction 210 can be performed upon image data 110 to identify spatial relationships between different identifiable features within the captured scene. The information regarding the spatial relationships and identified features can be stored as a features vector 230. Features vector 230 can generally be data relating to the features that have been extracted by feature extraction 210. In one or more embodiments, features vector 230 can be a series of values of the identified features/relations. Features extraction 210 can be performed by a device that has been trained to perform the extraction, as described in more detail below.

A process of first normalization 220 can be performed upon sparse depth data 120 to generate depth vector 240. First normalization 220 can normalize the sparse depth data 120 by modifying the range of values of depth data 120 in accordance with the ranges of values of features vector 230. For example, suppose each value of features vector 230 can range from 1-100, and suppose that each value of depth data 120 can range from 1-10. In this example, the values of depth data 120 can be modified to match the range of values of features vector 230. Depth vector 240 can generally be data relating to the depths that have been normalized by first normalization process 220.

The resulting features vector 230 (that results from feature extraction 210) can then be combined with depth vector 240. In one example embodiment, features vector 230 can be concatenated with depth vector 240. The combined vectors can then be normalized by a second normalization process 250. After performing the second normalization process 250, a normalized features vector 260 is generated. The second normalization process can be used to modify the length of the combined vectors in accordance with a length that is required by a regressor device that performs regression 270.

A process of regression 270 can be performed, by the regressor device, on the normalized features vector 260, and the regression process 270 then generates a predicted depth image 280. The regressor device can be trained, as described in more detail below.

After performing regression process 270, the predicted depth image 280 is a range image of the scene that is captured by image data 110. Each element/pixel of predicted depth image 280 shows a distance from a point in the scene to a specific point related to the range sensor, where the location of the point in the scene corresponds to the location of the element/pixel within the predicted depth image 280. The image resolution of predicted depth image 280 can be lower, greater, or the same as the image resolution of image data 110.

As described above, one or more embodiments train one or more devices to perform the functions of features extraction 210 and regression 270. For example, one or more embodiments can train one or more neural networks to perform the functions of feature extraction 210 and regression 270.

Figure 3:
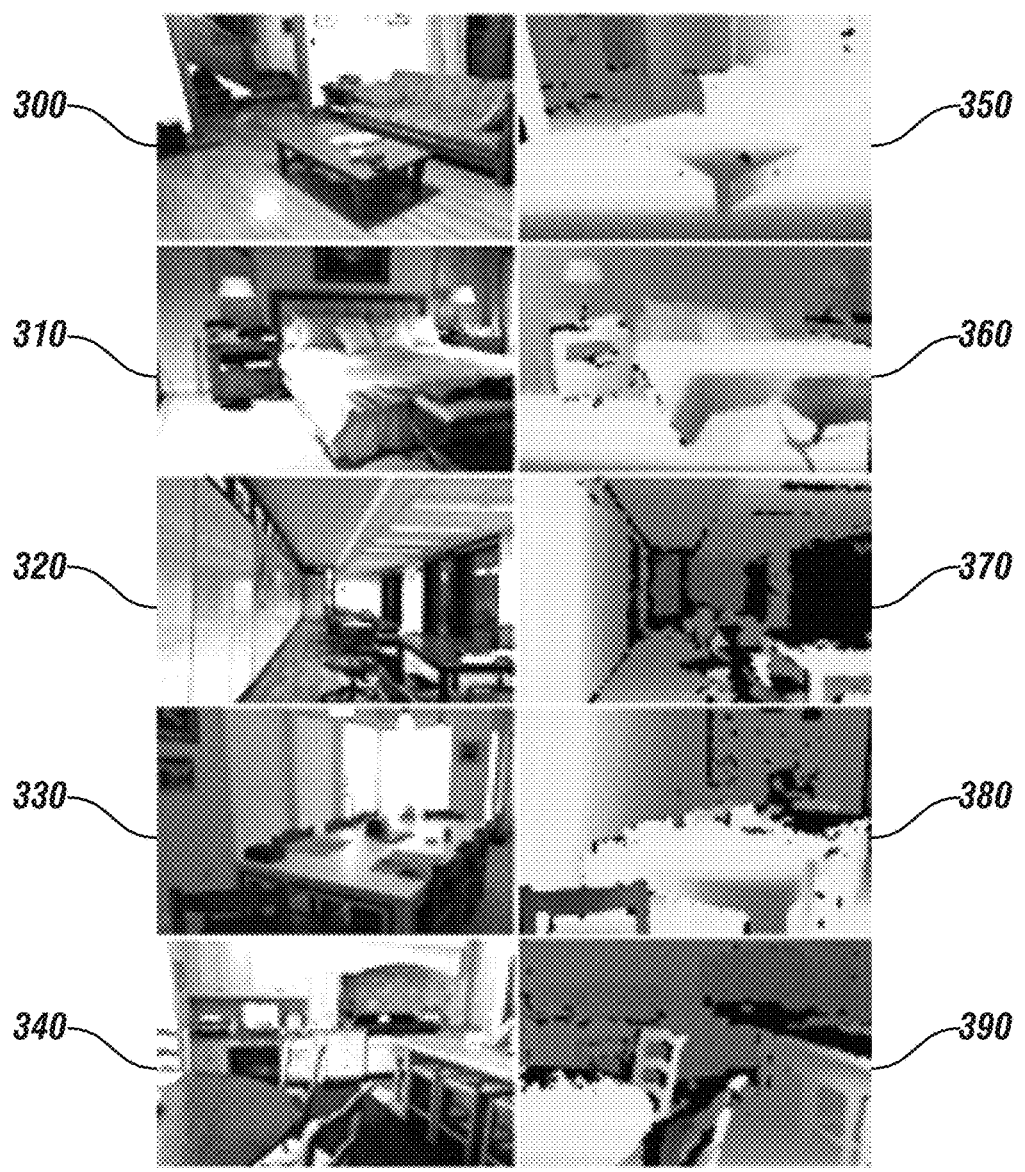
FIG. 3 illustrates example training images and actual depth data that is used to train one or more devices for performing feature extraction and regression in accordance with one or more embodiments.

FIG. 3 illustrates example training images (300-340) and actual depth data (350-390) that is used to train one or more machine-learning systems for performing feature extraction and regression in accordance with one or more embodiments. For example, the one or more machine-learning systems can receive input in the form of (1) image data from training images (300-340), and (2) the corresponding sparse data for each of the training images (300-340). Based on this input, the one or more machine-learning systems can generate range images that reflect the scenes depicted in the inputted images (300-340). The generated range images can then be compared against actual depth data (350-390).

The machine-learning system that performs the functions of feature extraction and/or regression can be based on, for example, one or more artificial neural networks (ANNs), which can use electronic components that mimic the processing architecture of the human brain. Artificial neural networks are often embodied as systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning.

In order to train the machine-learning system to perform the functions of feature extraction and regression, one or more embodiments seeks to: (1) reduce a range/depth error between the generated range/depth data and the actual depth data, (2) preserve a consistent ordering of depth of pixels (in terms of relative distance between the range sensor and the scene), and (3) preserve a range continuity across neighboring pixels. With regard to preserving the consistent ordering of pixel depth, the available actual depth data (such as actual depth data 350-390) provides a depth value of each pixel. For example, suppose that a first pixel of the actual depth data has an actual depth value of 5.6 meters, while a second pixel of the actual depth data has an actual depth value of 2.3 meters, and a third pixel of the actual depth data has an actual depth value of 6 meters. If these three example pixels are ranked in terms of actual depth value (from smaller depth value to higher depth value, for example), then the second pixel (of 2.3 meters) can be ranked first, the first pixel (of 5.6 meters) can be ranked second, and the third pixel (of 6 meters) can be ranked third. In other words, the above-described ranking can be considered to be a relative ranking (based on an increasing actual depth value) between the three example pixels. With one or more embodiments, when a range image is generated by machine-learning system, the relative ranking of pixels (of the generated range image) reflects the relative ranking of actual-depth-data pixels by actual depth data. In other words, with one or more embodiments, even though the generated depth data of any given pixel (of the generated range image) can be different from the pixel's depth data as reflected by the actual depth data, the relative ranking of pixels (of the generated range image) will be consistent with the relative ranking of actual-depth-data pixels by actual depth data. One or more embodiments can train one or more neural networks to minimize the following expression:

$$\frac{1}{n^2}\sum_{i,j}^{n}(\log y_i - \log y_i^*) + \frac{\lambda}{n}\sum_{i}^{n}\sum_{k\in s(i)} \mathit{diff}(\sigma(y_i, y_k), \sigma(y_i^*, y_k^*)) + |y_i - y_k|$$

In the above expression, "s(i)" represents a neighborhood of pixels of i. "o(a,b)" corresponds to the order of objects "a" and "b". Finally, if a=b, then diff(a,b)=0. Otherwise, if a≠b, then diff(a,b)=1.

With regard to results obtained via experiments, one or more embodiments inputted (1) image data (with a resolution of 304×228 pixels), and (2) sparse depth data of 10×10 depth pixels per image, into a neural network of five convolutional layers. The five convolutional layers performed feature extraction to generate the above-described features vector. Regression was then performed by a neural network of two connected layers to generate the above-described predicted depth image (with a resolution of 74×55 pixels).

Figure 4:
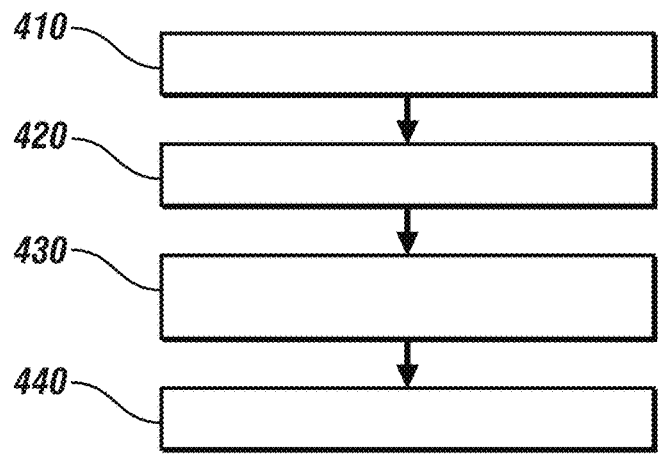
FIG. 4 depicts a flowchart of a method in accordance with one or more embodiments.

FIG. 4 depicts a flowchart of a method in accordance with one or more embodiments. The method of FIG. 4 can be performed in order to generate a range image using sparse depth data. The method of FIG. 4 can be performed by a controller in conjunction with a camera device and a range sensor. For example, the method of FIG. 4 can be performed by a vehicle controller that receives and processes imagery of a scene in which a vehicle is driven. The method can include, at block 410, receiving, by a controller, image data of a scene. The image data includes a first set of pixels. The method can also include, at block 420, receiving, by the controller, a sparse depth data of the scene. The sparse depth data includes a second set of pixels, and the number of the second set of pixels is less than the number of first set of pixels. The method can include, at block 430, combining the image data and the sparse depth data into a combined data. The method can include, at block 440, generating a range image using the combined data.

In view of the above, one or more embodiments can generate a high-resolution range image by combining image data (from a monocular camera, for example) and a sparse depth data (from a range sensor, for example). One or more embodiments can provide a higher resolution range image as compared to the images that are generated by the conventional devices. One or more embodiments can be implemented using one or more existing monocular cameras and one or more existing range measurement sensors. Because one or more embodiments can combine the image data and the sparse depth data via a computer program product, one or more embodiments can generate a high-resolution range image at a lower cost as compared to the images that are generated by the conventional devices.

Figure 5:
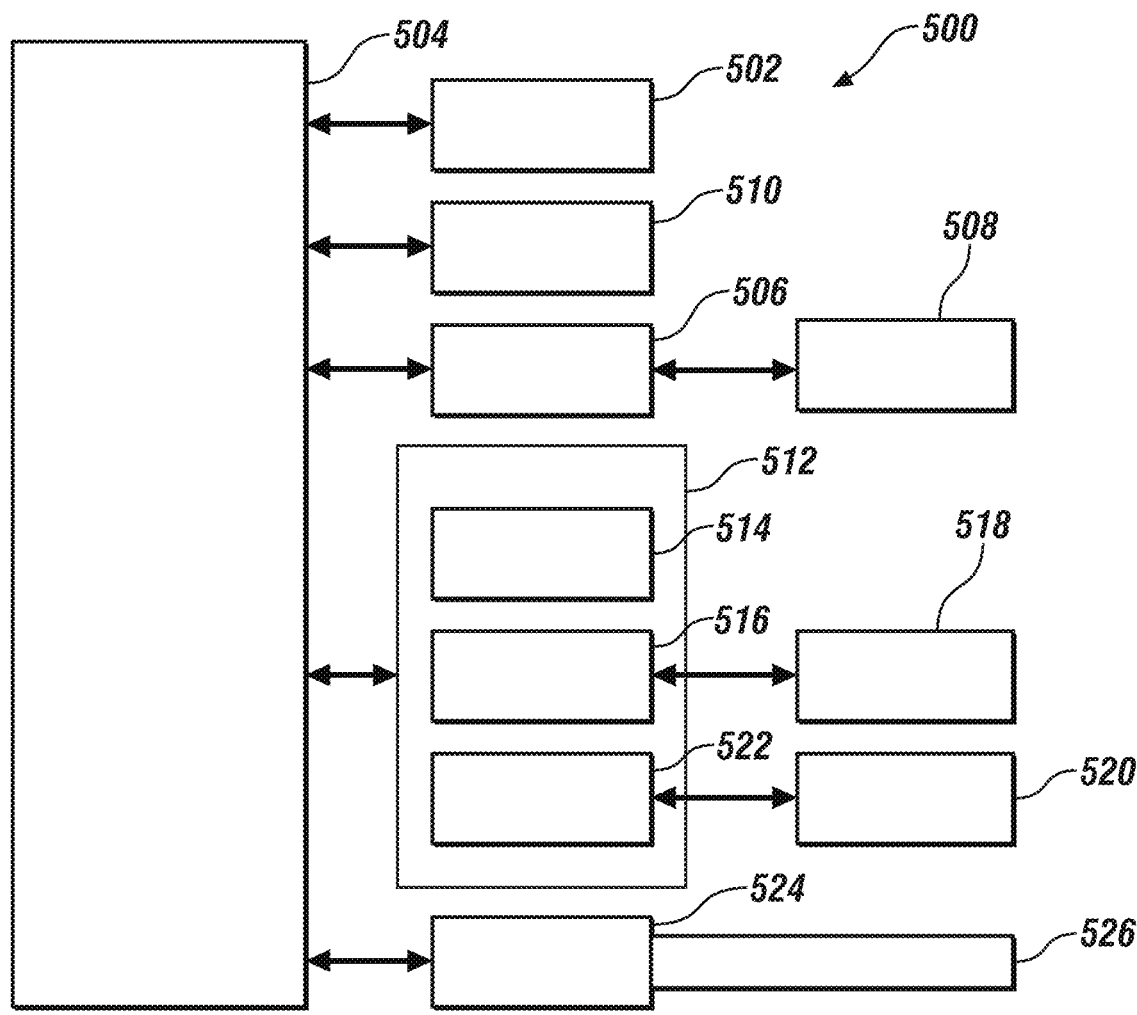
FIG. 5 depicts a high-level block diagram of a computing system, which can be used to implement one or more embodiments.

FIG. 5 depicts a high-level block diagram of a computing system 500, which can be used to implement one or more embodiments. Computing system 500 can correspond to, at least, a system that is configured to generate a range image using sparse depth data, for example. The generating system can be a part of a system of electronics within a vehicle that operates in conjunction with a camera and a range sensor. With one or more embodiments, computing system 500 can correspond to an electronic control unit (ECU) of a vehicle. Computing system 500 can be used to implement hardware components of systems capable of performing methods described herein. Although one exemplary computing system 500 is shown, computing system 500 includes a communication path 526, which connects computing system 500 to additional systems (not depicted). Computing system 500 and additional system are in communication via communication path 526, e.g., to communicate data between them.

Computing system 500 includes one or more processors, such as processor 502. Processor 502 is connected to a communication infrastructure 504 (e.g., a communications bus, cross-over bar, or network). Computing system 500 can include a display interface 506 that forwards graphics, textual content, and other data from communication infrastructure 504 (or from a frame buffer not shown) for display on a display unit 508. Computing system 500 also includes a main memory 510, preferably random access memory (RAM), and can also include a secondary memory 512. There also can be one or more disk drives 514 contained within secondary memory 512. Removable storage drive 516 reads from and/or writes to a removable storage unit 518. As will be appreciated, removable storage unit 518 includes a computer-readable medium having stored therein computer software and/or data.

In alternative embodiments, secondary memory 512 can include other similar means for allowing computer programs or other instructions to be loaded into the computing system. Such means can include, for example, a removable storage unit 520 and an interface 522.

In the present description, the terms "computer program medium," "computer usable medium," and "computer-readable medium" are used to refer to media such as main memory 510 and secondary memory 512, removable storage drive 516, and a disk installed in disk drive 514. Computer programs (also called computer control logic) are stored in main memory 510 and/or secondary memory 512. Computer programs also can be received via communications interface 524. Such computer programs, when run, enable the computing system to perform the features discussed herein. In particular, the computer programs, when run, enable processor 502 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method, the method comprising:
receiving, by a controller, image data of a scene, wherein the image data comprises a first set of pixels comprising a first order of magnitude;
receiving, by the controller, a sparse depth data of the scene, wherein the sparse depth data comprises a second set of pixels comprising a second order of magnitude, wherein the second order of magnitude is less than the first order of magnitude by at least one order of magnitude;
performing a feature extraction and regression process on the image data to generate a features vector, wherein said feature extraction and regression process is performed by a trained neural network, wherein said trained neural network is trained to reduce a depth error between a generated depth data and an actual depth data;
performing a first normalization on the sparse depth data to generate a depth vector, wherein the first normalization comprises modifying a range of values of the sparse depth data to match a range of values of the features vector;
combining the features vector and the depth vector into a combined vector; and
generating a range image using the combined vector.

2. The method of claim 1, wherein the second set of pixels corresponds to a fixed number of pixels arranged at fixed pixel locations.

3. The method of claim 1, wherein the receiving the image data comprises receiving the image data from a monocular camera.

4. The method of claim 1, further comprising performing a second normalization on the combined vector, wherein the second normalization comprises modifying the combined vector into a specific vector length.

5. The method of claim 1, wherein said trained neural network is trained to preserve a consistent ordering of depth of pixels.

6. The method of claim 1, wherein the features vector reflects identified spatial relationships between different identifiable features.

7. The method of claim 1 wherein the feature extraction process identifies spatial relationships between different identifiable features within the scene.

8. The method of claim 1 wherein the second order of magnitude is less than the first order of magnitude by at least two orders of magnitude.

9. A system within a vehicle, comprising:
a camera;
a range sensor;
an electronic controller configured to:
receive, from the camera, image data of a scene, wherein the image data comprises a first set of pixels comprising a first order of magnitude;
receive, from the range sensor, a sparse depth data of the scene, wherein the sparse depth data comprises a second set of pixels comprising a second order of magnitude, wherein the second order of magnitude is less than the first order of magnitude by at least one order of magnitude;
perform a feature extraction and regression process on the image data to generate a features vector, wherein said feature extraction and regression process is performed by a trained neural network, wherein said trained neural network is trained to reduce a depth error between a generated depth data and an actual depth data;

perform a first normalization on the sparse depth data to generate a depth vector, wherein the first normalization comprises modifying a range of values of the sparse depth data to match a range of values of the features vector;

combine the features vector and the depth vector into a combined vector; and generate a range image using the combined vector.

10. The system of claim 9, wherein the second set of pixels corresponds to a fixed number of pixels arranged at fixed pixel locations.

11. The system of claim 9, wherein the receiving the image data comprises receiving the image data from a monocular camera.

12. The system of claim 9, wherein the controller is further configured to perform a second normalization on the combined vector, wherein the second normalization comprises modifying the combined vector into a specific vector length.

13. The system of claim 9, wherein said trained neural network is trained to preserve a consistent ordering of depth of pixels.

14. The system of claim 9, wherein the features vector reflects identified spatial relationships between different identifiable features.

15. The system of claim 9 wherein the feature extraction process identifies spatial relationships between different identifiable features within the scene.

16. The system of claim 9 wherein the second order of magnitude is less than the first order of magnitude by at least two orders of magnitude.

* * * * *